US00RE43192E

(19) United States
(12) Reissued Patent
Isozu

(10) Patent Number: US RE43,192 E
(45) Date of Reissued Patent: Feb. 14, 2012

(54) DATA PROCESSING SYSTEM, INFORMATION PROCESSING APPARATUS, DATA PROCESSING METHOD, AND COMPUTER PROGRAM

(75) Inventor: Masaaki Isozu, Tokyo (JP)

(73) Assignee: Sony Corporation, Tokyo (JP)

(21) Appl. No.: 12/613,292

(22) Filed: Nov. 5, 2009

Related U.S. Patent Documents

Reissue of:
(64) Patent No.: 7,293,085
Issued: Nov. 6, 2007
Appl. No.: 10/313,188
Filed: Dec. 6, 2002

(30) Foreign Application Priority Data

Dec. 10, 2001 (JP) ..... P2001-375440

(51) Int. Cl.
*G06F 15/16* (2006.01)

(52) U.S. Cl. ..... 709/203; 709/224; 710/15; 710/17

(58) Field of Classification Search ..... 709/200–203, 709/217–227; 710/15, 17–18
See application file for complete search history.

(56) References Cited

U.S. PATENT DOCUMENTS

| | | | | |
|---|---|---|---|---|
| 6,085,240 | A | 7/2000 | Suzuki et al. | |
| 6,466,971 | B1 | 10/2002 | Humpleman et al. | |
| 6,505,228 | B1 | 1/2003 | Schoening et al. | |
| 6,745,252 | B1 | 6/2004 | Yanagawa et al. | |
| 7,028,102 | B1 | 4/2006 | Larsson et al. | |
| 7,602,756 | B2 * | 10/2009 | Gu et al. | 370/338 |
| 2002/0046268 | A1 | 4/2002 | Leong et al. | |
| 2003/0033395 | A1 | 2/2003 | Sato | |
| 2003/0041134 | A1 | 2/2003 | Sugiyama et al. | |
| 2003/0088651 | A1 | 5/2003 | Wilson, Jr. | |
| 2005/0044191 | A1 | 2/2005 | Kamada et al. | |

FOREIGN PATENT DOCUMENTS

| | | |
|---|---|---|
| JP | 05-173988 | 7/1993 |
| JP | 06-309262 | 11/1994 |
| JP | HEI 11-215164 | 8/1999 |
| JP | 2001-290724 | 10/2001 |
| JP | 2002-514797 | 5/2002 |
| JP | 2004-500632 | 1/2004 |

OTHER PUBLICATIONS

Japanese Office Action issued Aug. 23, 2011, for corresponding Japanese Appln. No. 2009-275087.

* cited by examiner

*Primary Examiner* — Moustafa M Meky
(74) *Attorney, Agent, or Firm* — K&L Gates LLP

(57) ABSTRACT

In an environment in which various usable information processing device exist in the neighborhood of a user, it is possible to a detect, from a main terminal used by a user, an information processing device having the function corresponding to a user request. By using the detected device, it is possible to perform data processing and data communication corresponding to the user request, which cannot be performed by one device. By transmitting a resources finding/using query packet to devices capable of data communication, the function confirmation and the environment setting of each information processing device can be performed. Even if the function of the information processing device dynamically changes, the device can be used based on the updated information.

54 Claims, 10 Drawing Sheets

FIG. 6A

Dst-Addr=useful-dev.jp.sony.com<43.11.141.11.>

Msg-Type=Query-dixcovery

Src-addr=own-dev.jp.sony.com<43.11.141.2>

User=Sony-Taro

Date=01/11/02 15:00−01/11/02 16:00

Param={ require-device-type=display-device user-requirement={wide-display,high-quality} contents=favorite-artist-live-movie

}

FIG. 6B

Dst-Addr= own-dev.jp.sony.com<43.11.141.2>

Msg-Type=Response

Src-addr= useful-dev.jp.sony.com<43.11.141.11

User=Sony-Taro

Date=01/11/02 15:00−01/11/02 16:00

Status=200 OK

DATA PROCESSING SYSTEM, INFORMATION PROCESSING APPARATUS, DATA PROCESSING METHOD, AND COMPUTER PROGRAM

Matter enclosed in heavy brackets [ ] appears in the original patent but forms no part of this reissue specification; matter printed in italics indicates the additions made by reissue.

BACKGROUND OF THE INVENTION

The present invention relates to a data processing system, a data transmission apparatus, a data receiving apparatus, a data processing method, and a computer program. More particularly, the present invention relates to a data processing system, a data transmission apparatus, a data receiving apparatus, a data processing method, and a computer program, which are capable of executing various types of information processing, such as communication, by efficiently using functions possessed by each device in a user environment in which resources as a plurality of information processing apparatuses can be used.

In recent years, data transfer of image, speech data, etc., via various communication media, such as the Internet communication, has been actively performed. Also, what is commonly called a ubiquitous computing network in which information devices such as personal computers (PCs), information home appliances, and portable terminals exist all around the household and offices and are interconnected with each other is being realized.

As described above, in a ubiquitous environment in which various information devices are ubiquitous, a plurality of devices which can be used simultaneously by a user exist in the neighborhood, and it is possible for the user to selectively use the plurality of devices or to concurrently use the plurality of devices. As a result of using the plurality of devices, efficient information processing in which the respective feature functions possessed by the plurality of devices, which is not possible by a single device possessed by a user, becomes possible.

For example, when communication with a communication device of another user via the Internet is performed using one communication device, high-quality communication can be realized by using together the functions of peripheral devices differing from the communication device in use.

In order to efficiently use such functions of a plurality of devices, there is a demand for service platforms for realizing environment-adaptive communication by dynamically combining the functions of a plurality of information processing apparatuses to be constructed. At present, as a technique for automatically setting devices for realizing the service platforms, Jini and UPnP (Universal Plug and Play) have been proposed.

UPnP is a technical specification for connecting devices, such as personal computers and peripheral devices, AV devices, telephone sets, home appliance products in a household, over a network so that functions are provided to each other. UPnP is proposed by Microsoft Corporation in 1999 and is supported by 20 or more companies, such as Intel Corporation, 3Com Corporation, AT&T, and Dell Computer Corporation. UPnP is based on a technique which is standard in the Internet and aims to function by merely being connected to the network without involving complex operations and setting operation. For the network infrastructure, Ethernet which is most widely used in a personal computer LAN, as well as standards for household LAN, such as HomePNA and HomeRF, are supported.

Jini is a technical specification for connecting various devices, such as personal computers, peripheral devices, AV devices, telephone sets, home appliance products, over a network so that functions are provided to each other. Jini is proposed by Sun Microsystems Incorporated, and is supported by many major companies, such as IBM Corporation, Cisco Systems, Motorola Inc., Canon Corporation, Sharp Corporation, and Sony Corporation. Since Jini is based on the JAVA technology of Sun Microsystems Incorporated, Jini is not dependent on a specific OS and a specific microprocessor. Devices compliant with Jini instantly functions by merely being connected to the network without involving complex operations and setting operation. In order to use Jini, it is necessary to install JVM (JAVA Virtual Machine), which is a JAVA execution environment, or to be able to use JVM installed by another device on the network.

However, the above-described Jini and UPnP techniques merely provide existing services by expanding the automatic setting mechanism of the OS and the network. In order to provide environment-adaptive communication, it is preferable that, not only simple automatic setting, but also changes in the user environment, which occur as a result of the movement of the user and the on/off state of a device be taken into consideration. Furthermore, it is preferable to realize more flexible environment adaptation, in which functions possessed by neighboring devices are dynamically connected in order to transparently maintain a plurality of sessions or in order to establish a session.

SUMMARY OF THE INVENTION

The present invention has been made in view of the above-described problems. An object of the present invention is to provide a data processing system, an information processing apparatus, an information receiving apparatus, and a data processing method, in which optimum device selection and device use are realized according to changes in the environment of devices as resources which can be used by a user.

Another object of the present invention is to provide a data processing system, an information processing apparatus, an information receiving apparatus, and a data processing method for adaptively performing communication with a communication party by using device resources in the neighborhood in an environment in which various information processing devices can be used.

Another object of the present invention is to provide a data processing system, an information processing apparatus, and a data processing method, which are capable of extracting a device having a high-level flexible session manager which realizes a simple starting and ending of a session by merely specifying a tool with a communication party user, movement and swapping of an active session among devices, and division and merging of sessions in units of media, and having functions which are necessary on the basis of the evaluation of a user request, and which are capable of finding and using a device having the optimum function from the devices in the neighborhood on the basis of the function evaluation of the devices in the neighborhood.

In a first aspect, the present invention provides a data processing system including a plurality of information processing apparatuses which can communicate with each other, the data processing system being configured in such a manner that a resources finding query in which requested function information based on a user request is stored is issued from one main information processing apparatus; it is determined whether or not the functions based on the requested function information stored in the received resources finding query can be provided in a peripheral information processing apparatus receiving the resources finding query, and a response in which the determination result is stored as status information is transmitted to the main information processing apparatus; a peripheral information processing apparatus for which the function is to be used on the basis of the response received by the main information processing apparatus from the peripheral information processing apparatus is selected, and a resources using query to the selected peripheral information processing apparatus is issued; and the function corresponding to the requested function is provided.

In one form of the data processing system of the present invention, each of the plurality of information processing apparatuses includes an application section for inputting a user request; rich communication assisting means for generating the resources finding query on the basis of the user request input to the application section and for issuing the resources finding query to a peripheral information processing apparatus; session management means for performing session management for performing data processing using the function of the peripheral information processing apparatus on the basis of the transmission of a response from the peripheral information processing apparatus; and an environment adaptive engine for performing processing for setting the function corresponding to the requested function.

In one form of the data processing system of the present invention, each of the plurality of information processing apparatuses includes an SCL processing section for dynamically detecting a change in the function of the information processing apparatus; and a service description database in which function information detected by the SCL processing section is stored, and a process for determining the capability of providing the requested function based on the reception of the resources finding query is performed based on the contents of the service description database.

In one form of the data processing system of the present invention, the resources finding query includes a transmission source address, which is the issuing source of the resources finding query; a transmission destination address which is the issuing destination of the resources finding query; and parameters as resources using period information and requested function information.

In one form of the data processing system of the present invention, the resources using query includes a transmission source address which is the issuing source of the resources using query; a transmission destination address which is the issuing destination of the resources using query; and parameters as resources using period information and requested function information.

In one form of the data processing system of the present invention, the resources using query contains setting information of an information processing module in the information processing apparatus which is the issuing destination of the resources using query.

In one form of the data processing system of the present invention, each of the plurality of information processing apparatuses includes rich communication assisting means for generating the resources finding query on the basis of a user request and issuing it to a peripheral information processing apparatus, and the rich communication assisting means performs processes for determining whether or not the determination of a peripheral information processing apparatus to be used is possible on the basis of the obtained function information of the peripheral information processing apparatus, generating the resources finding query only when the determination is not possible, and issuing the resources finding query to the peripheral information processing apparatus.

In one form of the data processing system of the present invention, each of the plurality of information processing apparatuses includes session management means for performing session management for performing data processing using the function of a peripheral information processing apparatus on the basis of the transmission of a response from the peripheral information processing apparatus; and an environment adaptive engine for performing processing for setting the function corresponding to the requested function, and the peripheral information processing apparatus receiving the resources using query issued by the main information processing apparatus performs session management in the session management means and an environment adaptive process in the environment adaptive engine on the basis of the resources using query or an environment setting packet issued by the main information processing apparatus.

In a second aspect, the present invention provides an information processing apparatus which is a constituent of a data processing system comprising a plurality of information processing apparatuses which can communicate with each other. The information processing apparatus includes means for generating a resources finding query in which requested function information based on a user request is stored and for transmitting the resources finding query to a peripheral information processing apparatus which is a constituent of the plurality of information processing apparatuses; means for receiving the resources finding query, determining whether or not the function based on the requested function information stored in the received resources finding query can be provided, and generating a response to be transmitted, in which the determination result is stored as status information; means for selecting a peripheral information processing apparatus for which the function is to be used on the basis of the transmission of the response for the resources finding query and for issuing a resources using query to the selected peripheral information processing apparatus; and means for performing a process of setting the provision of the function corresponding to the requested function on the basis of the reception of the resources using query.

In one form of the information processing apparatus, the information processing apparatus further includes an application section for inputting a user request; rich communication assisting means for generating the resources finding query on the basis of the user request input to the application section and for issuing the resources finding query to a peripheral information processing apparatus; session management means for performing session management for performing data processing using the function of the peripheral information processing apparatus on the basis of the transmission of a response from the peripheral information processing apparatus; and an environment adaptive engine for performing processing for setting the function corresponding to the requested function.

In one form of the information processing apparatus, the information processing apparatus further includes an SCL processing section for dynamically detecting a change in the function of the information processing apparatus; and a service description database in which function information detected by the SCL processing section is stored, and a process for determining the capability of providing the requested function based on the reception of the resources finding query is performed based on the contents of the service description database.

In one form of the information processing apparatus, the information processing apparatus further includes rich communication assisting means for generating the resources finding query on the basis of a user request and issuing the resources finding query to a peripheral information processing apparatus, wherein the rich communication assisting means performs processes for determining whether or not the determination of a peripheral information processing apparatus to be used on the basis of the obtained function information of the peripheral information processing apparatus is possible, generating the resources finding query only when the determination is not possible, and for issuing the resources finding query to the peripheral information processing apparatus.

In one form of the information processing apparatus of the present invention, the information processing apparatus further includes session management means for performing session management for performing data processing using the function of the peripheral information processing apparatus on the basis of the transmission of a response from the peripheral information processing apparatus; and an environment adaptive engine for performing processing for setting the function corresponding to the requested function, and the peripheral information processing apparatus receiving the resources using query issued by the main information processing apparatus performs session management in the session management means and an environment adaptive process in the environment adaptive engine on the basis of the resources using query or an environment setting packet issued by the main information processing apparatus.

In a third aspect, the present invention provides a data processing method for use with a data processing system including a plurality of information processing apparatuses which can communicate with each other. The data processing method includes the steps of: issuing, from one main information processing apparatus, a resources finding query in which requested function information based on a user request is stored; determining whether or not the functions based on the requested function information stored in the received resources finding query can be provided in the peripheral information processing apparatus receiving the resources finding query and transmitting a response, in which the determination result is stored as status information, to the main information processing apparatus; selecting a peripheral information processing apparatus for which the function is to be used on the basis of the transmission of the response received by the main information processing apparatus from the peripheral information processing apparatus and issuing a resources using query to the selected peripheral information processing apparatus; and providing the function corresponding to the requested function in the peripheral information processing apparatus receiving the resources using query.

In one form of the information processing method of the present invention, the data processing method further includes a step in which each of the information processing apparatuses performs an SCL processing step of dynamically detecting a change in the function of the information processing apparatus; and a step in which each of the information processing apparatuses stores a service description database in which function information detected by the SCL processing section is stored, and a process for determining the capability of providing the requested function based on the reception of the resources finding query is performed based on the contents of the service description database.

In one form of the information processing method of the present invention, the data processing method further includes a step in which the main information processing apparatus performs processes for determining whether or not the determination of a peripheral information processing apparatus to be used on the basis of the obtained function information of the peripheral information processing apparatus is possible, generating the resources finding query only when the determination is not possible, and issuing the resources finding query to the peripheral information processing apparatus.

In one form of the information processing method of the present invention, the data processing method further includes a step in which the peripheral information processing apparatus receiving the resources finding/using query issued by the main information processing apparatus performs session management in the session management means and an environment adaptive process in the environment adaptive engine on the basis of the environment setting packet issued by the main information processing apparatus.

In a fourth aspect, the present invention provides a computer program for executing information processing in an information processing apparatus which is a constituent of a data processing system including a plurality of information processing apparatuses which can communicate with each other. The program includes a step of generating a resources finding query in which requested function information based on a user request is stored and transmitting the resources finding query to a peripheral information processing apparatus which is a constituent of the plurality of information processing apparatuses; a step of receiving a resources finding query, determining whether or not the function based on the requested function information stored in the received resources finding query can be provided, and generating a response to be transmitted, in which the determination result is stored as status information; a step of selecting a peripheral information processing apparatus for which the function is to be used on the basis of the transmission of the response for the resources finding query and issuing a resources using query to the selected peripheral information processing apparatus; and a step of performing a process of setting the provision of the function corresponding to the requested function on the basis of the reception of the resources using query.

As described above, according to the configuration of the present invention, in an environment in which various usable information processing devices exist in the neighborhood of a user, it is possible to detect an information processing device having the function corresponding to a user request from a main terminal which is used by the user in response to the user request. Thus, by using the detected device, data processing and data communication corresponding to the user request, which cannot be performed by one device, become possible.

According to the configuration of the present invention, by transmitting a resources finding/using query packet to a device capable of data communication, the function confirmation and the environment setting of each information processing device become possible. Even when the function of the information processing device dynamically changes, the up-to-date function information of each information processing device can be obtained based on a service capability list (SCL) as the updated terminal capability description data.

According to the configuration of the present invention, each information processing device is configured to have a flexible session manager. Also, when another function which is not possessed by the communication device in use used by the data processing device itself is retrieved from the peripheral information processing devices, and a new session using the resources thereof is to be established, session management is performed in the flexible session manager in each information processing device, and thus a smooth progression of the communication session becomes possible.

Other objects, features, and advantages of the present invention will be apparent from a detailed description of the embodiments of the present invention (to be described later) and the attached drawings. The system in this specification is a logical assembly of a plurality of devices, and it does not matter whether the devices are inside the same housing.

Additional features and advantages of the present invention are described in, and will be apparent from, the following Detailed Description of the Invention and the figures.

BRIEF DESCRIPTION OF THE DRAWINGS

FIG. 6A shows a data example of a resources finding/using query used in the data processing system according to the present invention;

FIG. 6B shows a data example of a response used in the data processing system according to the present invention;

DETAILED DESCRIPTION OF THE INVENTION

Figure 1:
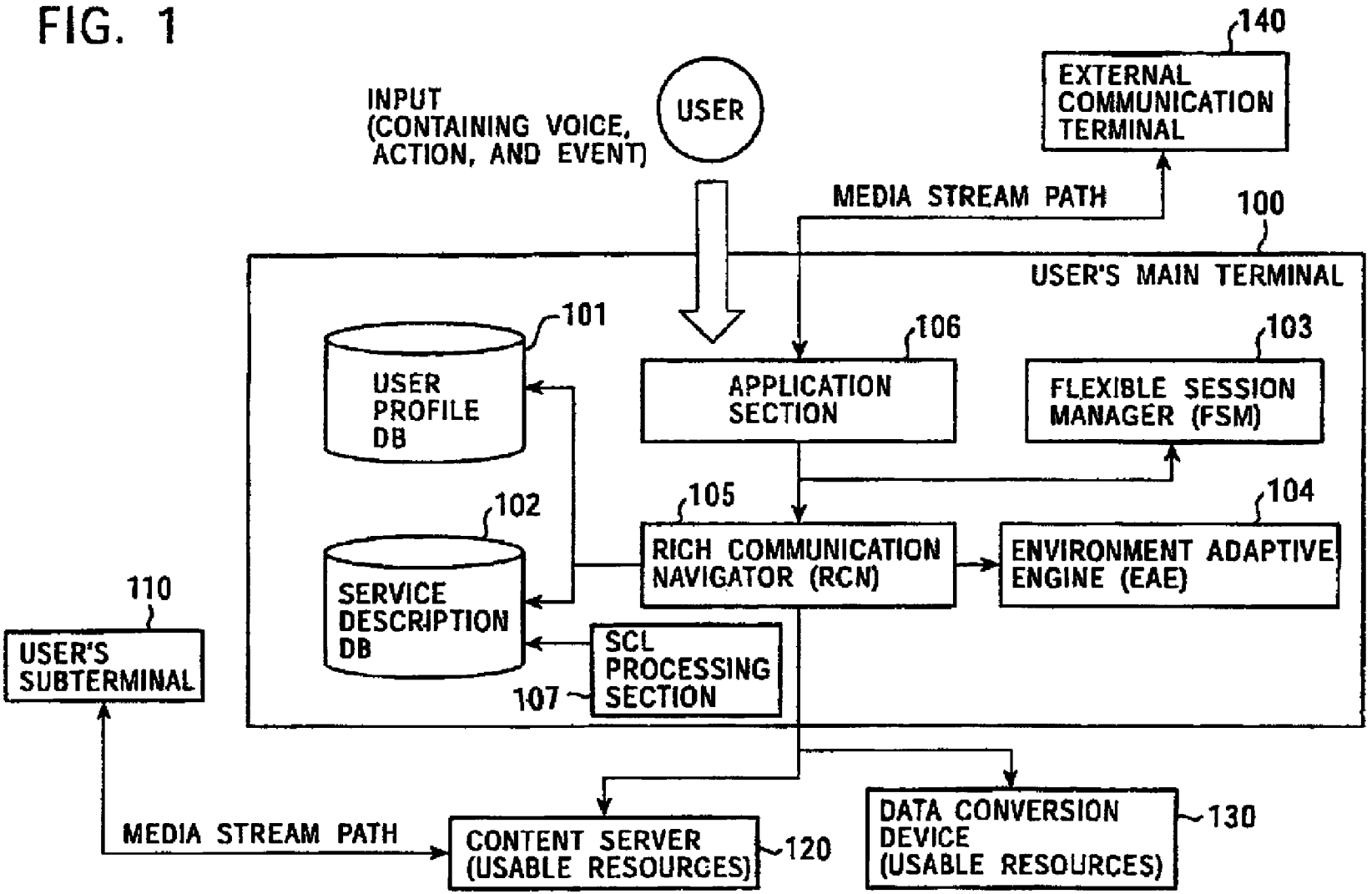
FIG. 1 shows the outline of the configuration and processes of a data processing system according to the present invention.

The outline of the system of the present invention will be described first with reference to FIG. 1. The data processing system of FIG. 1 has a user's main terminal 100, a user's subterminal 110, a content server 120, and a data conversion device 130 as information processing devices used by a certain user. As will be described in detail later, these information processing devices shown in FIG. 1 are devices which issue a query for finding resources from the user's main terminal 100 and which execute a response for that query. Based on these queries, when these devices are set as resources usable by the user, data communication using the function of each device, for example, the display function of the user's subterminal 110, the content distribution function of the content server 120, and the data conversion function of the data conversion device 130 (e.g., the conversion function of various types of coded data), such as MPEG and Motion-JPEG, is performed.

A user profile database 101, a service description database 102, a flexible session manager (FSM) 103, an environment adaptive engine (EAE) 104, a rich communication navigator (RCN) 105, an application section 106, and an SCL processing section 109 shown as each component inside the user's main terminal 100 are also formed in each of the user's subterminal 110, the content server 120, and the data conversion device 130, which are the other information processing devices, and each of them is able to perform the same process as that of the user's main terminal. In FIG. 1, it is assumed that the user's main terminal 100 is performing communication with an external communication terminal 140 by using a data communication network, such as the Internet, as a media stream path.

In the system of the present invention, the external communication terminal 140 is able to communicate with the user's main terminal 100, the user's subterminal 110, the content server 120, and the data conversion device 130 via a data communication network, such as the Internet and a LAN. The term "communication" used in the following description in the present invention refers to communication terminals, for example, computers and cellular phones, as information processing devices connected to the Internet, performing communication, such as a videophone call, by using duplex or simplex video and audio streams (real-time streams). The overall data communication of terminals via a data communication network is generically called "communication".

In FIG. 1, a case is assumed in which, when communication between the user's main terminal 100 which is mainly used by the user and the external communication terminal 140, which is a communication party, is being performed, a request occurs in which the user who is using the user's main terminal wants to perform communication using a plurality of devices by combining peripheral devices which exist around the user's main terminal 100, that is, the user's subterminal 110, the content server 120, and the data conversion device 130.

The user is performing video conference with the external communication terminal 140 according to, for example, a video conference application program set in the application section 106 of the user's main terminal 100. During this communication, when new data processing or communication using peripheral resources is to be performed, a user request is input from the user interface, set in the application section 106 of the user's main terminal 100. Then, a user request analysis process is performed in the rich communication navigator (RCN) 105 via the application section 106. Then, a resources finding query is multicast from the rich communication navigator (RCN) 105 to the rich communication navigator (RCN) of each of the user's subterminal 110, the content server 120, and the data conversion device 130, as the resources which can be used by the user.

The rich communication navigator (RCN) of each of the user's subterminal 110, the content server 120, and the data conversion device 130, serving as the resources, when receives the resources finding query, provides the function when the function requested by the user can be provided. For example, when the function requested by the user is a data conversion process for data which is transmitted and received between the user's main terminal 100 and the external communication terminal 140, a use in which, by setting by the flexible session manager (FSM) of the data conversion device 130 on the basis of a user request, the process for converting communication data between the user's main terminal 100 and the external communication terminal 140 is performed by the data conversion device 130 becomes possible. The environment adaptive engine (EAE) 104 has processing modules, possessed by each information processing device, for performing information processing, for example, data conversion processing, data display processing, and computation processing, and a cache section for temporarily storing data.

The user profile database 101 is a database, in which hobbies and preferences of users and the setting environment of devices possessed by the users are described, which is managed in a distributed manner among the devices. The service description database 102 is a database, in which the performance of the hardware of each device, types of software, and network services which can be provided are described, which is managed in a distributed manner among the devices. Each information processing device, including the's main terminal 100, is formed of hardware and software having a plurality of application programs. Each information processing device has an SCL processing section 107 formed of a capability detection daemon, which is a capability detection means for detecting the capability provided in the hardware and software, and capability information generation means for generating a terminal capability information file on the basis of the detected capability, and the information generated by the function of the SCL processing section 109 is stored in the service description database 102.

The capability detection daemon of the SCL processing section 107 is a program which is resident on the system, and when specific conditions are satisfied, the capability detection daemon is activated to realize capability detection means, such as hardware, software, etc., for detecting the capability of terminals. The capability detection daemon starts operating when dynamic changes occur in the hardware or software at the start-up of a terminal, that is, when a change is added to the hardware during start-up or when software is installed, or starts operating when a request from the user occurs. For example, in a portable terminal, since there is a possibility that a change is added to the hardware during start-up, such as removal/insertion of a PC card, when there is a change, the capability is detected. For this reason, a program for detecting a change needs to be resident. Since the function of the software is often determined when it is installed, usually, the capability needs to be detected only once when software is installed. When the user starts communication, there are cases in which real-time terminal information becomes necessary, and, therefore, the capability is detected on the basis of the request from the user. The detected capability of the terminal is sent to an SCL generation daemon.

The SCL generation daemon is a program which is activated when the capability detection daemon detects the capability of the terminal, and by forming the abilities of the terminals, detected by the capability detection daemon, into a list in a general-purpose format, capability information generation means for generating a terminal capability information file is realized. The abilities of the terminals are described by being formed into a list by using, for example, the tree structure of XML. XML is a description language which is based on the specification of the description language HTML and in which the specification is expanded so as to be able to describe a structured document. The specification of HTML is expanded so as to be able to define the logical structure of a document and the meaning of structural elements. For example, in XML, the tag of HTML is expanded so that any term defined in the tag by the user can be used, and the specification of the meaning of elements forming the document has become possible. By specifying a nest structure by using DTD (Document Type Definition), the relationships among document forming elements can be defined in a tree form. The terminal capability description which is formed as a list by using XML is called "service capability list (SCL)". The generated SCL is stored in the service description database 102. At this time, as an ID, an identification code which can be externally referred to, i.e., a global and unique code (e.g., an IPv6 address), is assigned. This makes it possible to increase the interoperability of the SCL on the network. At least only the ID needs to be described in one SCL.

For example, the rich communication navigator (RCN) of each of the user's subterminal 110, the content server 120, and the data conversion device 130, serving as the resources, which has received a resources finding query, obtains the up-to-date information of the function which dynamically changes in each device by referring to the service capability list (SCL) stored in the service description database of each device, making it possible to determine whether or not the function can be provided.

In the system of the present invention, it is possible to provide, to a user, communication in which the functions possessed by the device used by the user and by the devices which exist in the neighborhood are dynamically combined and a plurality of devices are used simultaneously according to the computer environment on site. The operations of the present invention are broadly formed of two operations. The two operations will be briefly described with reference to the block diagram of the entire system shown in FIG. 1.

A resources finding/retrieval process is an operation for finding neighboring devices and retrieving the corresponding function on the basis of the request and the action of the user. In FIG. 1, based on the function extracted on the basis of the action and the request of the user, by referring to the user profile database 101 and the service description database 102, the user's main terminal 100 finds the user's subterminal 110, the content server 120, and the data conversion device 130 by using the provided network interface, and retrieves the functions possessed by these devices.

A session management process is an operation for managing and operating a plurality sessions in various states. In FIG. 1, by using the function of the found device, starting, ending, and changing of a session are performed by the flexible session manager 103. At this time, the setting of the device is performed by the environment adaptive engine 104, and after the setting is completed, a plurality of sessions are generated among the devices.

Figure 2:
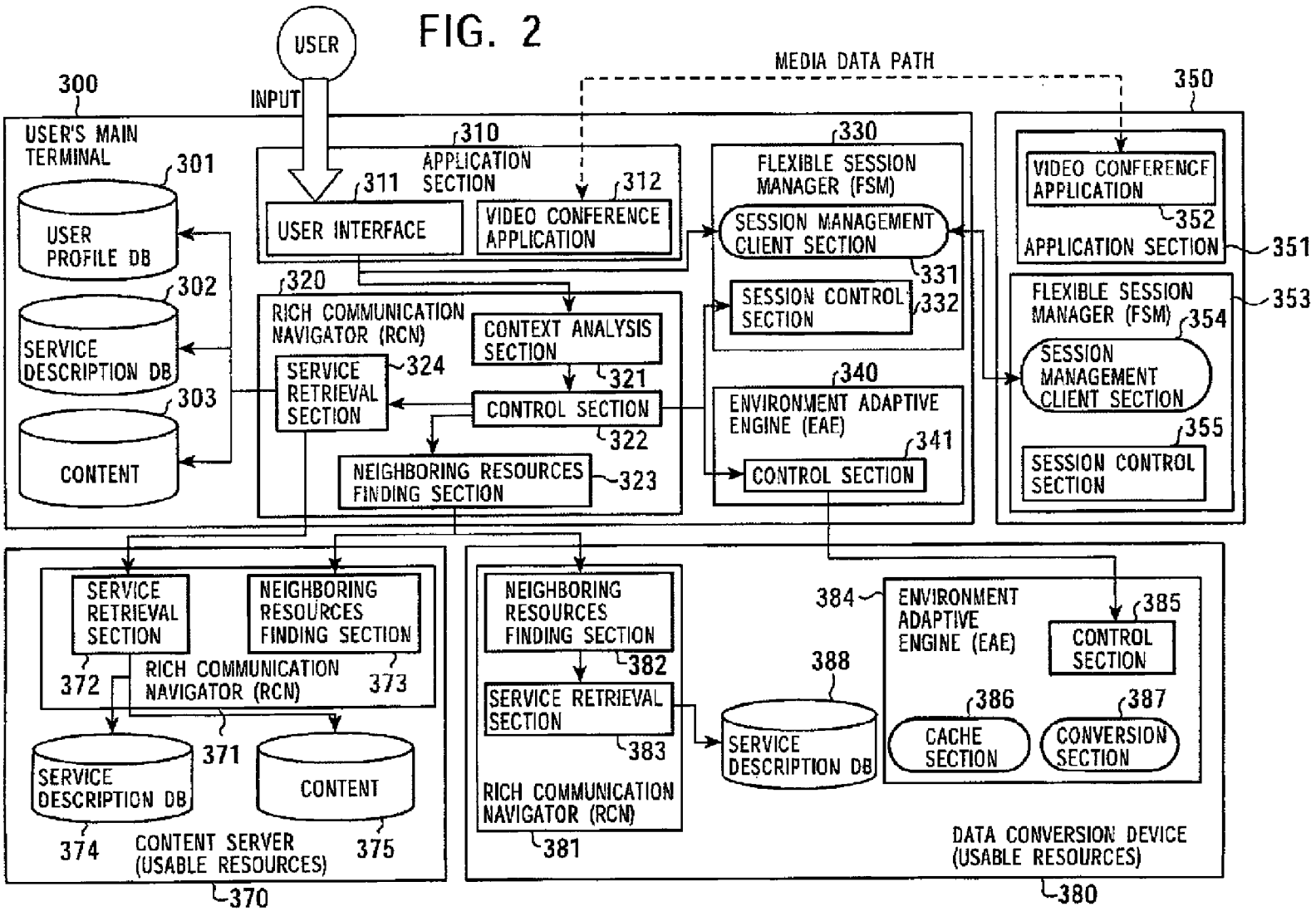
FIG. 2 shows details of the configuration and processes of the data processing system according to the present invention.

Next, referring to FIG. 2, a description will now be given of the detailed configuration of the information processing apparatus of the present invention. FIG. 2 shows a user's main terminal 300, a content server 370, a data conversion device 380, which are information processing devices serving as resources which can be used by the user, and a communication party terminal 350 which performs communication with the user's main terminal. The internal components of the user's main terminal 300 will now be described below. These internal components are also provided similarly in the content server 370, and the data conversion device 380, serving as the neighboring resources.

The application section 310 has a user interface section 311 formed of hardware and software parts for receiving actions and words of the user as inputs. For the user interface section 311, for example, various input forms, such as, a mouse event, a keyboard event, a device movement detected information input, a speech input during conversation, etc., are applicable. A video conference application 312 is an example of the application possessed by the application section 310. As communication software, the video conference application 312 is provided as software part by which a user performs communication by using a duplex or simplex real-time stream. The application section 310 performs a video conference application as well as various service providing applications corresponding to the device.

In FIG. 2, the communication party terminal 350 which performs communication with the user's main terminal 300 also has an application section 351 having a video conference application 352 in a similar manner. As a result of both the applications being activated, video conference communication becomes possible.

The rich communication navigator (RCN) 320 is a processing section for mainly performing a process for retrieving other usable resources. A context analysis section 321 is a section for analyzing information input from the user interface section 311 of the application section 310. For example, the context analysis section 321 performs a process for analyzing neighboring resources finding request data input from the user interface section 311 and for extracting information required to generate a resources finding query, or performs a process for extracting a token as necessary information from audio information such that speech is input to the user interface section 311 and for extracting information required to generate a resources finding query.

A neighboring resources finding section 323 is a processing section for performing a resources finding process used for specifying an information processing device as resources for providing the function corresponding to the user request. A service retrieval section 324 is a section for checking whether a device having the function extracted by the context analysis section 321 exists near the user. By outputting a resources finding query packet, which is an inquiry packet, to peripheral information processing devices over the network interface, the retrieval of resources and services is performed based on the response packet from another device with respect to the resources finding query packet. In addition to the inquiry to the device itself, the retrieval can also be performed by making an inquiry to a directory server.

A control section 322 performs control of each of the context analysis section 321, the neighboring resources finding section 323, and the service retrieval section 324, or performs control of message transmission and reception with other devices. A service retrieval section 372 and a neighboring resources finding section 373 of a rich communication navigator (RCN) 371 of the content server 370, and a service retrieval section 383 and a neighboring resources finding section 382 of a rich communication navigator (RCN) 381 of the data conversion device 380, shown in FIG. 2, have the same functions as those described above.

The flexible session manager (FSM) 330 is a processing section for performing session management. A session management client section 331 performs process control for actually starting, ending, and changing a stream session. A session control section 332 is a processing section for controlling the method of operating a session, and determines an operation method based on a message from the rich communication navigator of the device itself or of another device and transmits the operation method to the session management client section 331. More specifically, for example, based on the message from the rich communication navigator, the session control section 332 performs a process for changing a data communication session, in which direct communication with another device is performed, to a session in which communication is performed via another resource.

In FIG. 2, a communication party terminal 350 which is performing communication with the user's main terminal 300 also has a session management client section 354 and a session manager 353 having a session control section 355 in a similar manner, and the session is maintained by the processes of both the flexible session managers.

The environment adaptive engines (EAE) 340 and 384 have a processing module for performing information processing, for example, a data conversion process, a data display process, a computation process, etc., possessed by each information processing device, and a cache section for temporarily storing data. For example, the environment adaptive engine (EAE) 384 of the data conversion device 380 has a conversion section 387. The conversion section 387 is hardware or software for converting the stream media format during communication and converting the media type itself. For example, the conversion section 387 performs media format conversion, such as a conversion from MPEG to Motion-JPEG, and media type conversion such as a conversion from speech to characters.

The cache section 386 is a section for temporarily caching stream data during communication. In the module environment adaptive engine, a group of various processing modules corresponding to each device is stored. When the device does not possess an appropriate module, this can be dealt with by uploading/downloading the module over the network. The control sections 341 and 385 are sections for setting and controlling an environment adaptive engine on the basis of the message from the rich communication navigator of another device.

A user profile database 301 is a database in which hobbies and preferences of users and the setting environment of devices possessed by the users are described. The user profile database 301 is managed in a distributed manner among the devices. A service description databases 302, 374, and 388 are databases, in which the performance of the hardware of each device, types of software, and network services which can be provided are described. The databases 302, 374, 388 are managed in a distributed manner among the devices. The process for updating the database is performed by the process of the SCL processing section in the manner described above. Content databases 303 and 375 are databases in which various files of still images, moving images, speech, etc., possessed by users, are stored.

As described above, in the system of the present invention, communication, in which functions possessed by the device used by the user and the devices which exist in the neighborhood are dynamically combined and a plurality of devices can be used simultaneously according to the computer environment on site, is provided to the user. The processes in the system of the present invention are broadly classified into two processes: (1) a resources finding/retrieval process, i.e., a process for finding neighboring devices and retrieving the corresponding functions on the basis of the request and action of the user, and (2) a session management process, i.e., a process for managing and operating a plurality of sessions in various states. The details of these processes will now be described below with reference to the drawings.

A description will now be given first of a resources finding/retrieval process performed as a process for finding neighboring devices and retrieving the corresponding functions with reference to FIG. 3. The resources finding/retrieval process is a process for finding neighboring devices and for retrieving appropriate functions from these devices. First, it is considered that the user takes a certain action because of changes in the computer environment. For example, it is assumed that the user inputs, from the user interface such as the keyboard, as "a low-quality video stream which is being currently viewed by a PDA is switched to a high-quality television nearby". The request input may be performed as a keyboard input, a speech input, and in addition, a device switching request input based on the detection of an action of the user, for example, a detection such that the user has returned home.

Figure 3:
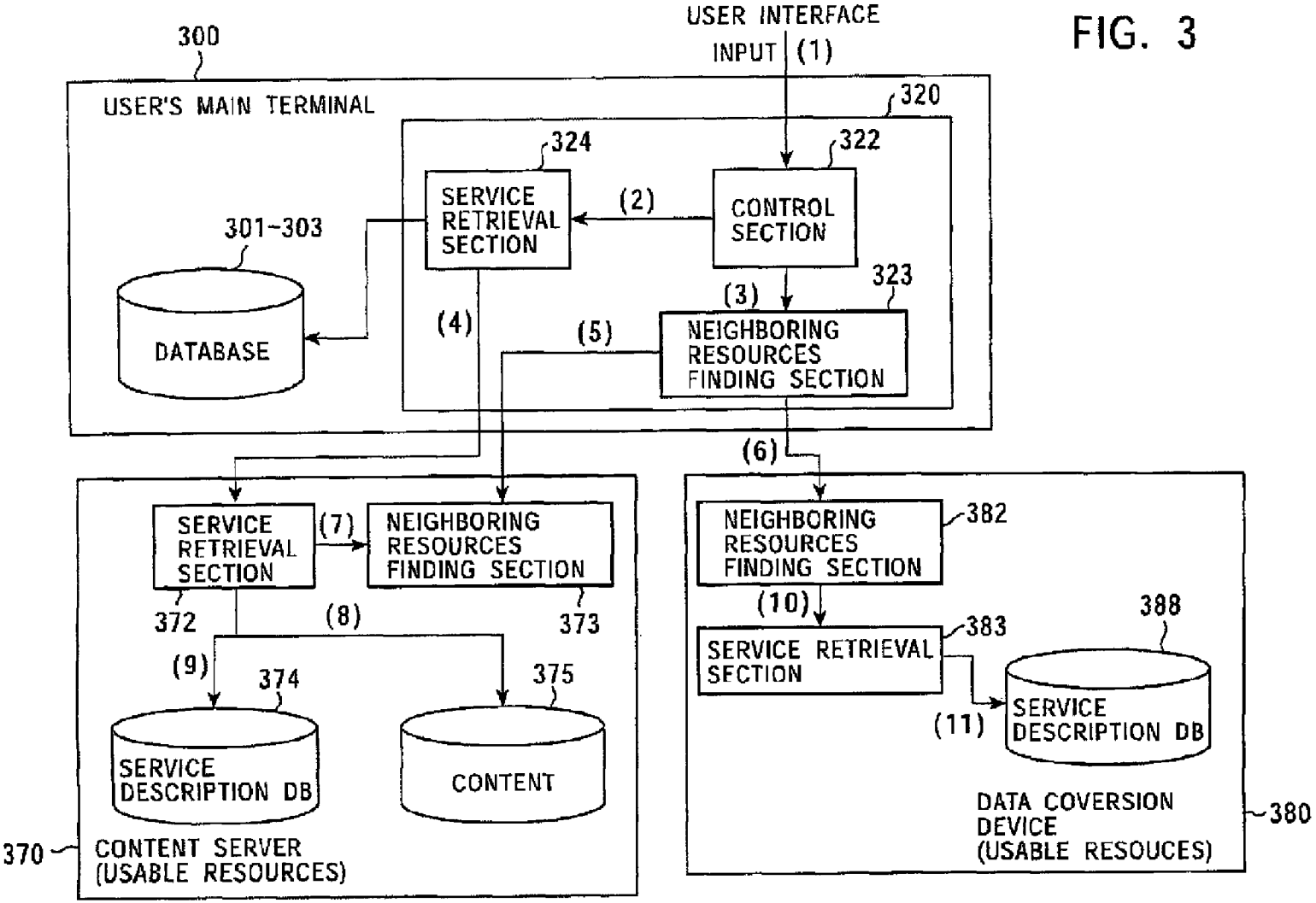
FIG. 3 illustrates a resources finding/retrieval process performed in the data processing system according to the present invention.

Referring to FIG. 3, the details of the resources finding/retrieval process will now be described. A description is given in such a manner as to correspond to each process of (1) to (10) shown in FIG. 3. Initially, the user input information is input to the control section 322 of the rich communication navigator (RCN) 320 via the user interface (process (1)). Next, the control section 322 requests the service retrieval section 324 and the neighboring resources finding section 323 to find the service resources on the basis of the user input information (processes (2) and (3)). At this time, there are two cases according to the specific situation of the device to be used.

a. When the device to be used has not been specified on the basis of the information possessed by the user's main terminal.

When the device capable of providing the function corresponding to the user request cannot be specified, the device having the corresponding function is found by issuing a resources finding query to the service retrieval section 324, the databases 301 to 303 of the user's main terminal 300 itself, and the service retrieval sections and the neighboring resources finding sections of neighboring devices.

b. When the device to be used has been specified.

When the device for providing services based on the request from the user, that is, the device to be used by the user, has been specified, the service retrieval section 324 directly issues a device using query only to the specified device.

First, a specific example of the operation "a" will now be described. It is assumed here that the user's main terminal requires a "display function" and "video content in which live performances are recorded". The user's main terminal inquires the service retrieval section 324 whether the user's main terminal itself has the corresponding function, and the local service description database 302 returns the result. When the inquiry cannot be solved locally, a resources finding query is issued to the neighboring devices.

Figure 4:
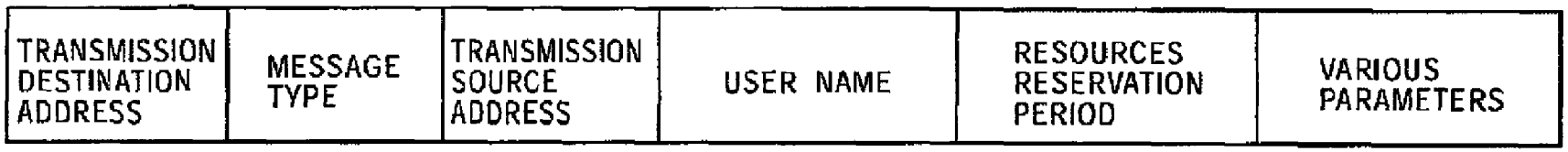
FIG. 4 shows the data structure of a resources finding/using query used in the data processing system according to the present invention.

The internal structure of the resources finding/using query packet is shown in FIG. 4. The internal data of the resources finding/using query packet will now be described.

A Transmission destination address stores the address of a specific device, which is a destination to which a message packet is transmitted, and a multicast address within the same link. A message type indicates whether the message packet is a finding query or a using query. A transmission source address stores the address of a device, which is a source for transmitting a message packet. A user name stores the name of the user who uses the resources. A using period stores the period in which the resources are used. Various parameters includes functions required by the devices as conditions. Examples thereof are a "display function" and a "speech output function". When the device to be used can be specified, the names of the resources are described.

Referring back to FIG. 3, the description of the resources finding/retrieval process is continued. For example, when the service retrieval section 372 of the content server 370 of FIG. 3 receives a resources finding query packet (for example, certain content is to be retrieved) (process (4)), the service retrieval section 372 inquiries the service description database 374 and the content database 375 (processes (8) and (9)).

There are cases in which, depending on the contents of the resources finding query packet, resources whose state changes dynamically are required. In that case, an inquiry is made to not only the database, but also to the neighboring resources finding section (process (7)). The result for the inquiry is returned to the service retrieval section 324 of the user's main terminal 300. Regarding whether devices exist near the user, each device obtains neighboring resources information (processes (5) and (6)) by using the neighboring resources information registered in the device in advance or by performing a process for exchanging information containing address information in the neighboring resources finding sections 323, 373 and 382 of each device.

For example, as shown in FIG. 3, when there are two neighboring resources, that is, the content server 370 and the data conversion device 380, the resources finding/using query packet from the user's main terminal 300 is multicast to all the neighboring resources. The device receiving the resources finding/using query packet returns a response packet.

Figure 5:
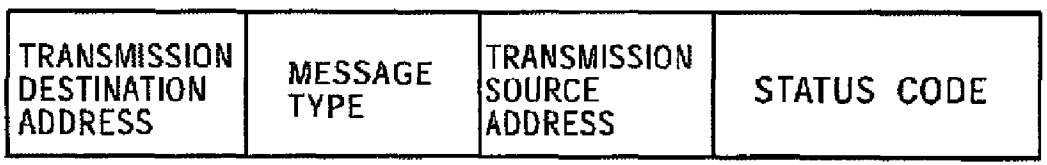
FIG. 5 shows the data structure of a resources finding/using response used in the data processing system according to the present invention.

The internal structure of the response packet is shown in FIG. 5. The internal data of the resources finding/using response packet will now be described. A transmission destination address stores the address of a specific device to which a message packet is transmitted, and a multicast address within the same link. A message type indicates whether the message packet is a response packet. A transmission source address stores the address of a device, which is a source for transmitting the message packet. Status code indicates whether or not the query has been successful, that is, whether or not the device provides the function in response to the request of the resources finding/using query.

A specific example of the resources finding/using query packet, and a specific example of the resources finding/using response packet are shown in FIGS. 6A and 6B, respectively. FIG. 6A shows an example of a resources finding/using query, in which there is shown the transmission destination address, the message type indicating a resources finding query, the transmission source address, the user name, the using period as a period in which resources are used, and parameters in which requests for a wide angle and high-quality display are made for a display device, and an artist live movie which is specified as content. FIG. 6B shows an example of a resources finding/using response, in which there is shown the transmission destination address, the message type indicating a response, the transmission source address, the user name, the using period as a period in which resources are used, and a function provision acknowledgement (OK) which is specified as a status.

When the device and the function which are used can be specified through the transmission and reception of each packet of the above-described resources finding query and resources finding response, the resources using query packet as a request for using the device is issued to the corresponding device. The resources using query packet has the same data structure as that described with reference to FIG. 4, and the message type is set to a using query. The setting of the resources reservation period can be reserved when a resources finding query packet is issued, that is, when services are retrieved. However, there is a possibility that the resources reservation period is changed, such as a reservation is made at an interval over time from the retrieval. The resources reservation period information is also stored in the resources using query packet.

As described above, each packet of the resources finding/using query and the resources finding/using response is transmitted and received between the user's main terminal 300 and the usable resources as the peripheral devices thereof. The device which provides the function corresponding to the user request input via the user interface is selected from the neighboring resources.

Next, a session management process for managing and operating a plurality of sessions in various states will now be described with reference to FIG. 7. The session management process is a process for establishing a new session or changing a session, in which an information processing apparatus is retrieved as resources in the process of the resources finding/retrieval process (1) described above.

The details of the session management process will now be described with reference to FIG. 7. A description is given in such a manner as to correspond to each process of (1) to (4) shown in FIG. 7. For management operations, such as the starting and the ending of the session, signaling using a normal session starting protocol can be applied. However, in the system of the present invention, the setting of the environment adaptive engine is also performed at the same time in synchronization with the request from the session starting protocol and the rich communication navigator.

Figure 7:
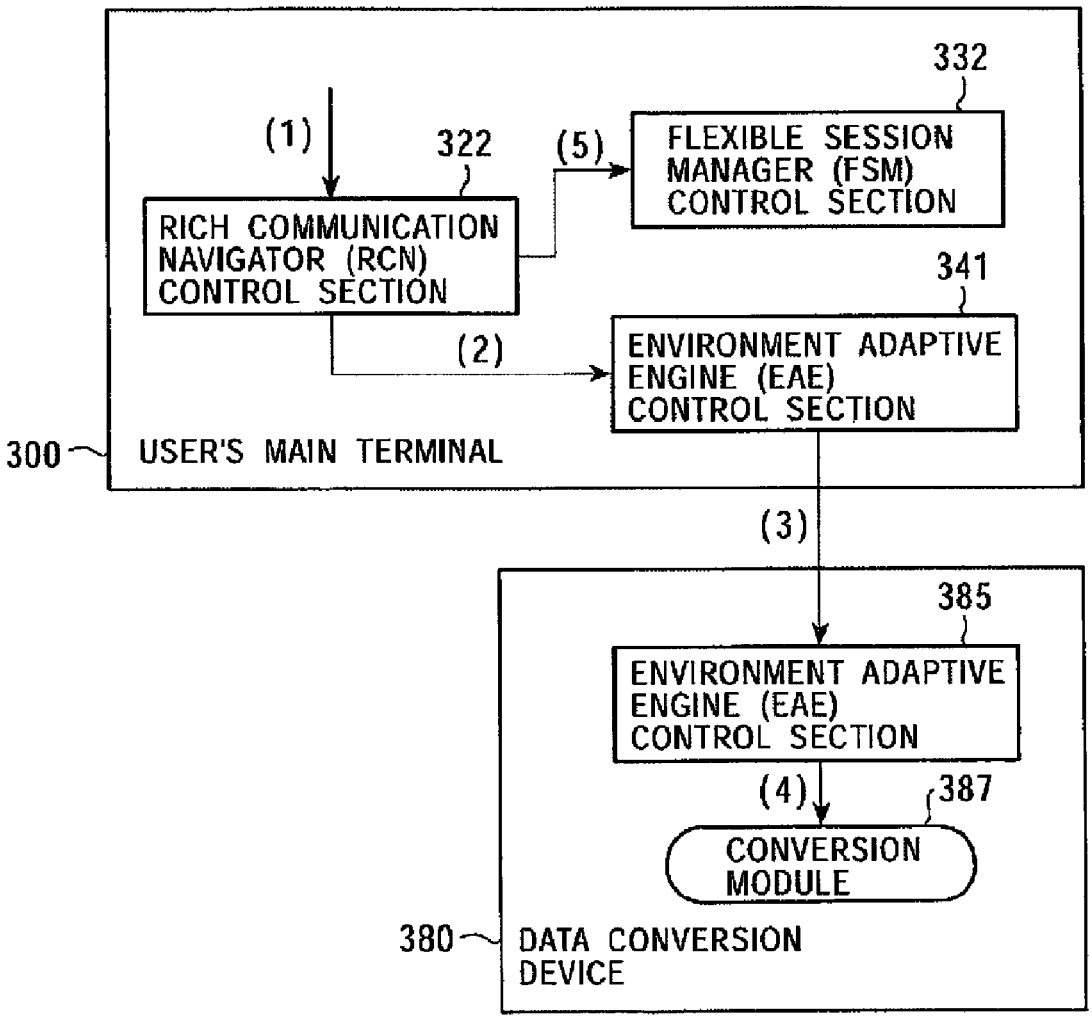
FIG. 7 illustrates a session management process performed in the data processing system according to the present invention.

Referring to FIG. 7, the details of the session management operation will now be described by using, as an example, a process in which the user's main terminal 300 selects, as a neighboring device to be used, the data conversion device 380, which is a server, for performing a media format conversion. When the rich communication navigator (RCN) control section 322 of the user's main terminal 300 determines the device to be used and the function to be used, the information is passed to the environment-adaptive-engine control section 341 on the user's main terminal 300 side (process (2)). At the same time, the rich communication navigator (RCN) control section 322 also passes the same information to the flexible session manager (FSM) control section 332 (process (5)).

The environment adaptive engine (EAE) control section 341 on the user's main terminal side issues an environment setting packet (process (3)) to the environment adaptive engine (EAE) control section 384 of the data conversion device 380 as the usable resources determined by the transmission and reception of the above-described resources finding/using query and response packet, while being synchronized with the session starting protocol. The contents of the environment setting packet differ according to the function possessed by the neighboring device. As shown in FIG. 7, when a data conversion process using the function of the conversion section 387 of the data conversion device 380 is requested, the environment setting packet is formed as a packet containing the input/output address/port and the input/output media format, for the purpose of setting the conversion section 387. Even when the group of modules does not exist in the neighboring devices, it is possible to upload/download the group of modules from another device. When the processes thereof are to be performed, the environment setting packet is formed as a packet containing the setting information thereof. The environment adaptive engine (EAE) control section 384 of the environment adaptive engine (EAE) 384, which has received the environment setting packet, performs the setting of the conversion section 387 according to the packet (process (4)).

The environment setting packet may be formed so as to be issued together with the resources using query. In this case, environment setting information, such as the input/output address/port and the input/output media format, for the purpose of setting the data processing module, is stored in the resources using query. The information processing apparatus receiving the resources using query performs the setting of the module in accordance with the information within the resources using query.

In the system of the present invention, each information processing apparatus is configured to have a flexible session manager. Also, when another function which is not possessed by the communication device in use used by the data processing apparatus itself is retrieved from peripheral information processing apparatuses, and a new session using the resources thereof is to be established, session management is performed in the flexible session management in each information processing apparatus, and a smooth progression of the communication session becomes possible.

Next, referring to FIG. 8, a processing sequence performed in the system of the present invention will now be described by showing a specific example. The example described in the following corresponds to the system configuration of FIG. 1. The user has a user's main terminal, a user's subterminal, a content server, and a data conversion device as usable resources, i.e., information processing apparatuses, and an example of performing a communication process between the user's main terminal and the external communication terminal is shown.

The user has a user's main terminal as a terminal which is mainly used, and the user's subterminal is a terminal which is used secondarily. A content server in which content is stored, and a conversion device for performing a process for converting the media type, etc., exist in the neighborhood. A case is assumed in which a request (JI) occurs in which a session using a duplex stream, such as a television conference, is desired to be established with the communication party, that is, the request is input from the user interface of the application section 310 in FIG. 2.

First, in order to find a neighboring terminal, a resources finding query (M1) is multicast to neighboring resources from the user's main terminal. In the rich communication navigator 320, the resources finding query (M1) is issued to all the information processing devices as the neighboring resources, that is, the user's subterminal, the content server, and the data conversion device.

As described above with reference to FIG. 5, the resources finding query (M1) is a packet in which the transmission destination address, the resources finding query as the message type, the transmission source address, the user name, the using period as a period in which resources are used, and parameters are set.

Figure 8:
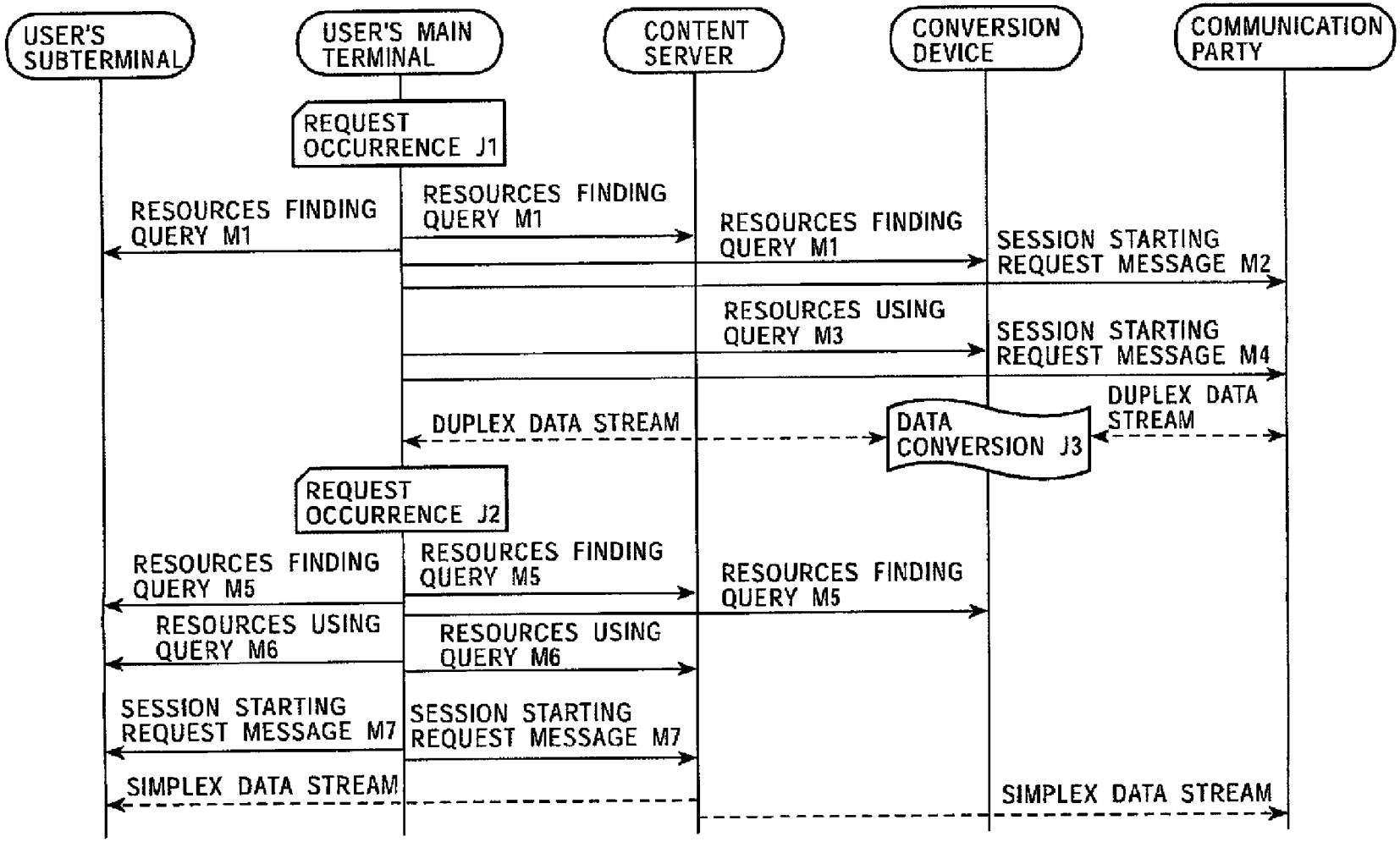
FIG. 8 illustrates a processing sequence performed in the data processing system according to the present invention.

Thereafter, although not shown in FIG. 8, a response packet for the resources finding query is returned to the user's main terminal from each of the information processing device, the user's subterminal, the content server, and the data conversion device. The response packet is a packet in which, as described above with reference to FIG. 6, the transmission destination address, the message type indicating that the packet is a response, the transmission source address, the user name, the using period as a period in which the resources are used, and the approval or refusal information of providing the function as a status are set.

Thereafter, the user who uses the user's main terminal issues a session starting request message (M2) from the user's main terminal to the communication party in order to perform data communication with the communication party over the network such as the Internet, and receives a response therefor. Here, when a satisfactory communication cannot be performed between the communication party and the user terminal if maintained as is, in the above-described resources finding query (M1) and a response receiving process, a resources using query is issued to the found information processing apparatus.

At this point, a resources using query (M3) is issued to a conversion device capable of data conversion in data communication between the user's main terminal and the communication party. In this resources using query, environment setting information, such as the input/output address/port and the input/output media format, for the purpose of setting the data processing module, i.e., the conversion module, possessed by the conversion device, is contained. The conversion device receiving the resources using query performs necessary setting.

After the resources using setting, a session starting confirmation message (M4) is issued from the user's main terminal to the communication party, and the setting, the confirmation, etc., of the session are performed in their respective flexible session managers (FSM). When the setting is completed in this manner, a duplex data stream on which data conversion (J3) in the conversion module of the conversion device is performed is established between the user's main terminal and the communication party with a conversion device in between.

Next, a case is considered in which, while the session between the user's main terminal and the communication party, involving the above-described conversion process, is continued, a request (J2) of desiring to receive content in a streaming manner by the user's subterminal is input via the user interface of the user's main terminal. Initially, the user's main terminal generates, in response to a request input, a resources finding query in which the rich communication navigator (RCN) sets "streaming reception of content" as a parameter, and issues the generated resources finding query to the neighboring devices (M5), receives, from the user's subterminal which exists in the neighborhood, a resources finding response packet in which status information of content reception OK is stored. Also, the user's main terminal receives, from the content server, a resources finding response packet in which status information of content provision OK is stored, determines that the process for providing content to the user's subterminal from the content server is possible, and issues a resources using query to these information processing devices (M6).

The user's main terminal transmits a resources using query, in which a content transmission processing request to the user's subterminal and the communication party is set as a parameter, to the content server. Also, the user's main terminal transmits a resources using query, in which a content receiving process from the content server is set as a parameter, to the user's subterminal.

When the setting of using the resources is performed in each information processing apparatus receiving the resources using query, the user's main terminal issues a session starting request message (M7) to each information processing apparatus receiving the resources using query. The device receiving a distribution request message performs setting for starting distribution and reception, and after the setting is completed, the streaming distribution of content is performed from the content server to the user's subterminal and the communication party terminal.

Figure 9:
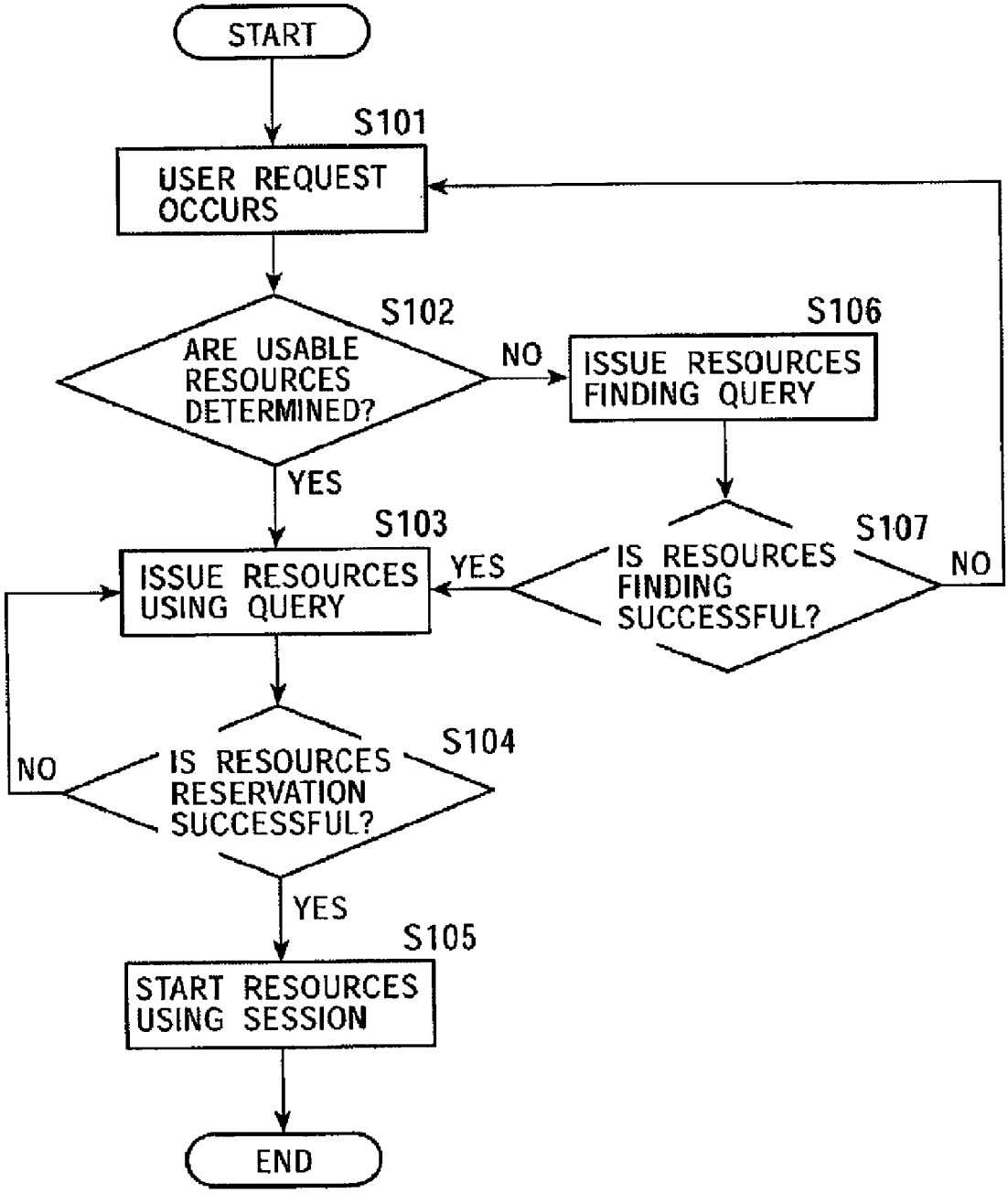
FIG. 9 is a flowchart illustrating processes performed in a user's main terminal in the data processing system according to the present invention.

Next, referring to the flowchart in FIG. 9, a description will now be given of the processing procedure in the main terminal which performs a process for finding an information processing apparatus as usable resources. Referring to the system configuration view of FIG. 2, the processes of the steps in the flowchart of FIG. 9 are described. In step S101, a user request is input via the user interface section 311 of the application section 310 of the user's main terminal 300. Then, in step S102, it is determined whether or not an information processing apparatus as usable resources can be specified. This is a step in which, since the transmission of the resources finding query to the peripheral devices and the reception of the resources finding response have already been performed, and the information of the other devices is already possessed within the device itself, the determination of the usable resources based on the response packet is possible, and a check is made to determine whether or not a new resources finding query need not to be issued.

When it is determined that the usable resources determination process within the device is impossible, the process proceeds to step S106, where the rich communication navigator (RCN) 321 of the user's main terminal 300 issues a resources finding query to the peripheral devices as the usable resources, for example, the content server 370 and the data conversion device 380 shown in FIG. 2.

As described above with reference to FIG. 5, the resources finding query is a packet in which the transmission destination address, the resources finding query as the message type, the transmission source address, the user name, the using period as a period in which the resources are used, and parameters are set. Thereafter, a response packet is returned to the user's main terminal, and when the resources finding is successful on the basis of the status of the response packet (Yes in step S107), the process proceeds to step S103.

When it is determined that the usable resources determination process within the device, i.e., the user's main terminal 300, is possible, a process for issuing a new resources finding query is not performed, and the process proceeds to step S103. In step S103, the rich communication navigator (RCN) 321 of the user's main terminal 300 issues a resources finding query to the determined usable resources. It is assumed in this flowchart that the resources finding query is a packet in which the environment setting information containing module setting information of devices to be used is stored. In step S104, the rich communication navigator (RCN) 321 of the user's main terminal 300 receives status information that the packet can be used for the response packet to the resources finding query. Then, in step S105, session management, a module setting process, etc., in the flexible session manager and the environment adaptive engine are performed, and thus a session using the resources is started.

Figure 10:
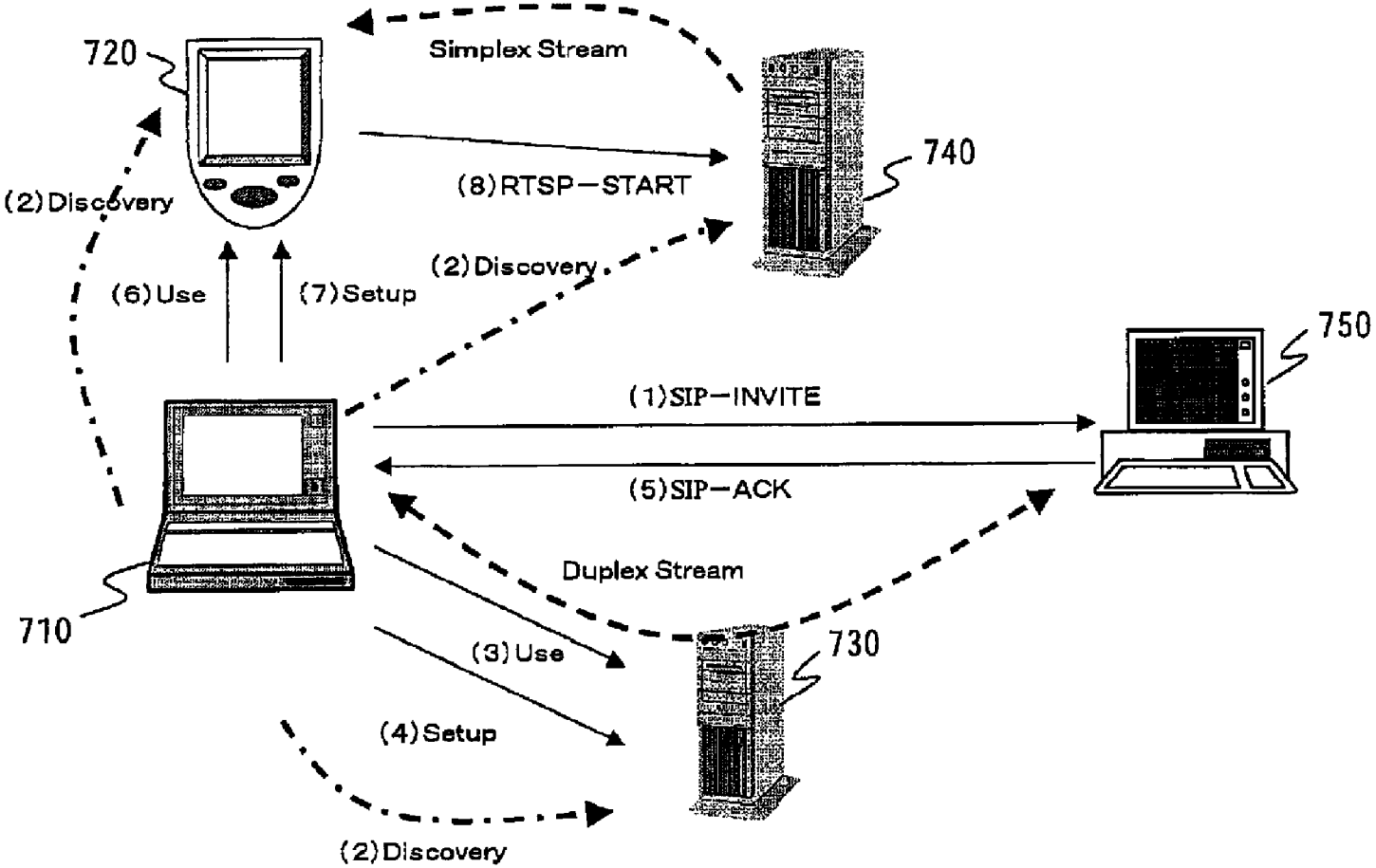
FIG. 10 illustrates an example of processes performed in the data processing system according to the present invention.

Next, referring to FIG. 10, a description will now be given of an example of data communication among devices in the system of the present invention. FIG. 10 shows an example in which, by using two terminals of a user PC (main terminal) 710 and a user PDA (subterminal) 720, the user communicates with a communication PC 750, which is a conmiunication party, by using a videophone. Existing techniques are used in such a manner that SIP is used for the duplex session starting protocol and RTSP is used for the simplex stream session starting protocol.

Initially, when a request of desiring to perform a videophone call with the communication party is received from the user, an SIP-INVITE message (see (1)) is transmitted from the user PC 710 to the communication PC 750 which is a communication party. The SIP-INVITE message is for a message exchange process for exchanging function information, such as the media format which can be used among communication devices. In FIG. 10, all responses for the messages are omitted. When a response for the SIP-INVITE message is received, since the media format which can be handled among the PCs differ, it is determined that communication with each other cannot be performed.

Here, the user PC 710 performs a resources retrieval process by issuing, by multicast, a resources finding packet to check whether there is a device which performs the conversion of the media format in the neighborhood and by receiving a response therefore (see (2)). As a result of the resources retrieval using this resources finding packet, the user PDA 720, the data conversion device 730, and the content server 740 are found in the neighborhood. It is determined on the basis of the resources finding/response packet that the device which can be used for data conversion is the data conversion device 730.

Next, a resources using packet in which the using period is set or the setting information of the processing module is stored is issued to the data conversion device 730, and the using procedure is performed. The resources using packet and the environment setting packet may be separate packets, and after the using procedure using the resources using packet is completed (see (3)), the environment setting packet may be issued to perform environment setting (see (4)). When all the settings are completed, the user PC 710 transmits a SIP-PAK message to the communication party PC 750 (see (5)).

When the response therefor is received, a both-way videophone call is performed between the user PC 710 and the communication PC 750 via the data conversion device 730. Furthermore, if a request for performing communication while viewing a video stream is received from the user, in order to retrieve a content server in which a video stream is stored and a device capable of displaying the video stream, which exist in the neighborhood, a resources retrieval process is further performed by issuing by multicast a resources finding packet and by receiving a response therefore (see (2)).

As a result of the resources retrieval using this resources finding packet, the user PDA 720, the data conversion device 730, and the content server 740 are found in the neighborhood. Based on the resources finding response packet, the content server 740 is found as the content server in which a video stream is stored, and the user PDA 720 is found as a device capable of displaying the video stream.

After these resources are found, a resources using packet in which a using period is set is issued, and a using procedure is performed (see (6)). After the using procedure is completed, an environment setting packet is issued to perform environment setting (see (7)). When all the settings are completed, an RTSPSTART message is issued to the content server 740 (see (8)), and a simplex video stream is viewed. As a result of the above, a high-level communication using a plurality of devices, in which neighboring devices are used, such as a videophone call being performed by the user PC 710 while a video stream is viewed by the PDA 720 in hand, becomes possible.

The series of processes described in the above-described embodiments can be performed by hardware, software, or a combined configuration of both. When processes are to be performed by software, the processes can be performed by installing a program in which a processing sequence is recorded to the memory within a data processing apparatus incorporated into dedicated hardware, or by installing the program into a general-purpose computer capable of performing various processes. When processes are to be performed by software, the programs forming the software are installed into, for example, a general-purpose computer, a microcomputer, etc.

Figure 11:
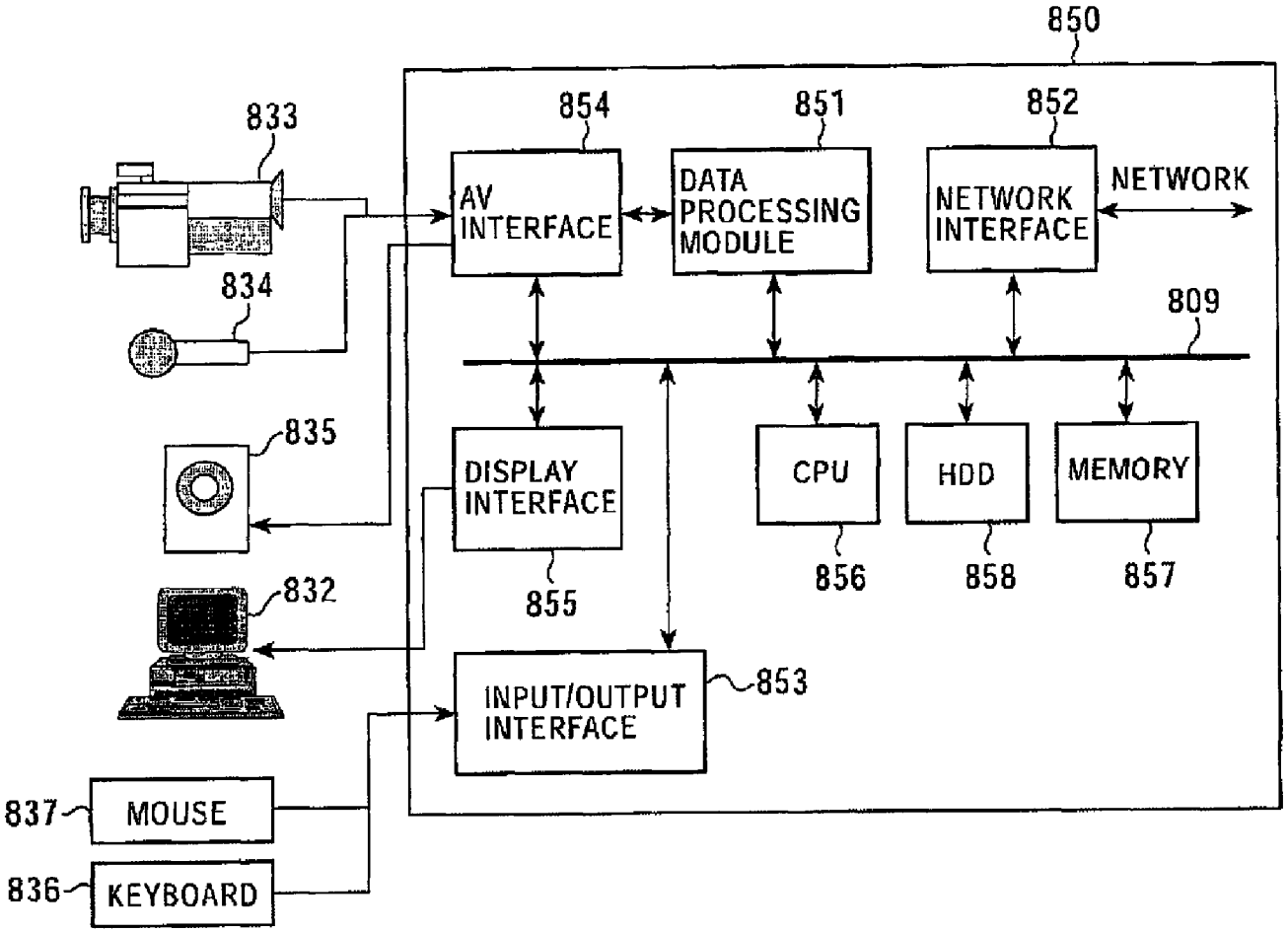
FIG. 11 shows an example of the configuration of an information processing apparatus used in the data processing system according to the present invention.

FIG. 11 shows an example of the configuration of a user's main terminal which performs a series of processes described in the above-described embodiments, and various information processing apparatuses as neighboring resources. The information processing apparatus shown in FIG. 11 shows an example of the hardware configuration which performs the functions described above with reference to FIGS. 1, 3, and so on. More specifically, FIG. 11 shows an example of the configuration of the hardware apparatus for performing each process of the user profile database 101, the service description database 102, the flexible session manager (FSM) 103, the environment adaptive engine (EAE) 104, the rich communication navigator (RCN) 105, the application section 106, and the SCL processing section 107, which are shown as the components inside the user's main terminal 100 of FIG. 1.

An information processing apparatus (e.g., a PC) 850 of FIG. 11 has a CPU 856 for generating the above-described resources finding/using query packet and for executing various programs such as a process for analyzing a response for each packet; a memory 857 formed of a RAM for storing various programs controlled and executed by the CPU 856, for storing data, and for functioning as a work area for the CPU 856, and a ROM; and an HDD serving as a storage medium for storing data and programs, these being connected to a PCI bus 859 so that data can be transmitted to and received from each other. The information processing apparatus 850 further has a data processing module 851 for performing a specific function in each device, such as, for example, a data conversion process.

Furthermore, the information processing apparatus 850 has a network interface 852 functioning as an interface with the communication network; an input/output interface 853 with input devices such as a mouse 837, a keyboard 836, etc.; an AV interface 854 for performing data input/output from AV data input/output devices such as a video camera 833, a microphone 834, and a speaker 835; and a display interface 855 functioning as a data output interface for a display device 832.

In the example of the configuration of FIG. 11, when an information processing terminal having a video conference execution function is used as an example, the data processing module 851 inputs, for example, image data from the video camera 833 and speech data from the microphone 834, and performs a coding process thereon, after which the data processing module 851 performs a packet generation process (packetizes), and finally generates a packet in which coded data is a payload. The generated packet is output to the PCI bus 859, and is output to the network via the network interface 852, and is distributed to the destination address which is set in the header of the packet. This packet data is used as communication data for a video conference application. The received packet in which moving-image coded data such as a video conference is stored is subjected to a decoding process in the data processing module 851, and the packet is reproduced and output in the display device 832 and the speaker 835.

On the other hand, the resources finding/using query packet which is input over the network, or a response packet is output to the bus 856 via the network interface 852, and is processed under the control of the CPU 856, whereby data analysis of the resources finding/using query packet or the response packet is performed to perform a process for finding resources or an environment setting process.

The programs of the process for generating the resources finding/using query packet, the data analysis process of the response packet, and the environment setting process are stored in the memory 857, such as a ROM, and are executed by the CPU 856. However, in addition to the program stored in the ROM, it is possible for the CPU 856 to execute a program by loading a program which is stored in a hard disk or a program which is installed as a result of being transferred and received from a satellite or a network into a memory such as a RAM (Random Access Memory).

In this specification, the program may be processed by one computer, and may also be processed in a distributed manner by a plurality of computers. Furthermore, the program may be transferred to a distant computer, whereby the program is executed. The computer program of the present invention is, for example, a computer program which can be provided in the form of a storage medium or a communication medium in a computer-readable form, for example, a recording medium such as a CD, an FD, and an MO, or a communication medium such as a network, to a general-purpose computer system which is able to execute various program codes. As a result of providing such a program in a computer-readable form, a process corresponding to the program is realized on the computer system.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A data processing system comprising:

a main information processing apparatuses for issuing a resources finding query in which requested function information based on a user request is stored;

a plurality of peripheral information processing apparatuses each in communication with said main information processing apparatus for receiving said resources finding query and having an SCL processing section for dynamically detecting changes in resource capability of the peripheral information processing apparatus, each peripheral information processing apparatus determining whether a function, based on the requested function information stored in the received resources finding query and the processing by the SCL processing section, can be provided by the peripheral information processing apparatus, and transmitting a response in which the determination result is stored as status information to said main information processing apparatus;

wherein said main information processing apparatus selects a peripheral information processing apparatus for which the function is to be used on the basis of the response received by said main information processing apparatus from said plurality of peripheral information processing apparatus, issues a resources using query to the selected peripheral information processing apparatus, and provides the function corresponding to said requested function to the selected peripheral information processing apparatus.

2. A data processing system according to claim 1, wherein each of said plurality of peripheral information processing apparatuses comprises:

an application section for inputting a user request;

rich communication assisting means for generating a resources finding query on the basis of a user request input to said application section and for issuing the resources finding query to at least one other peripheral information processing apparatus;

session management means for performing data processing using the function of a peripheral information processing apparatus on the basis of the transmission of a response to the resources finding query from the peripheral information processing apparatus; and an environment adaptive engine for performing processing for setting the function corresponding to said requested function.

3. A data processing system according to claim 1, wherein each of said plurality of peripheral information processing apparatuses comprises:

a service description database in which the capability information detected by said SCL processing section is stored, wherein a process for determining the capability of providing a user requested function based on the reception of a resources finding query is performed based on the contents of said service description database.

4. A data processing system according to claim 1, wherein said resources finding query comprises a transmission source address, which is the issuing source of the resources finding query; a transmission destination address which is the issuing destination of the resources finding query; and parameters as resources using period information and requested function information.

5. A data processing system according to claim 1, wherein said resources using query comprises a transmission source address which is the issuing source of the resources using query; a transmission destination address which is the issuing destination of the resources using query; and parameters as resources using period information and requested function information.

6. A data processing system according to claim 1, wherein said resources using query contains setting information of an information processing module in the information processing apparatus which is the destination of the resources using query.

7. A data processing system according to claim 1, wherein each of said plurality of peripheral information processing apparatuses comprises rich communication assisting means for generating a resources finding query on the basis of a user request and issuing it to the other of said plurality of peripheral information processing apparatus, and said rich communication assisting means performs processes for determining whether or not the determination of a peripheral information processing apparatus to be used is possible on the basis of the obtained function information of the peripheral information processing apparatus, generating said resources finding query only when the determination is not possible, and issuing the resources finding query to the peripheral information processing apparatus.

8. A data processing system according to claim 1, wherein each of said plurality of peripheral information processing apparatuses comprises;

session management means for performing data processing using the function of another peripheral information processing apparatus on the basis of the transmission of a response to a resources finding query from the another peripheral information processing apparatus; and an environment adaptive engine for setting the function corresponding to a requested function, wherein the peripheral information processing apparatus receiving said resources using query issued by said main information processing apparatus performs session management in said session management means and an environment adaptive process in said environment adaptive engine on the basis of said resources using query or an environment setting packet issued by said main information processing apparatus.

9. An information processing apparatus which is a constituent of a data processing system comprising a plurality of peripheral information processing apparatuses which can communicate with each other, said information processing apparatus comprising:

means for generating a resources finding query in which requested function information based on a user requested function is stored and for transmitting the resources finding query to a peripheral information processing apparatus which is a constituent of said plurality of information processing apparatuses;

means for receiving a resources finding query from one of the peripheral information processing apparatuses;

an SCL processing section for dynamically detecting changes in resource capability of the peripheral information processing apparatus;

means for determining whether or not a function, based on a requested function information stored in the received resources finding query and the processing by the SCL processing section, can be provided, and generating a response to be transmitted, in which the determination result is stored as status information;

means for selecting a peripheral information processing apparatus for which the user requested function is to be used on the basis of the transmission of a response to the transmitted resources finding query and for issuing a resources using query to the selected peripheral information processing apparatus; and means for performing a process of setting the provision of a function corresponding to said requested function information on the basis of the reception of said resources using query from the one of the information processing apparatuses.

10. An information processing apparatus according to claim 9, further comprising:

an application section for inputting a user request;

rich communication assisting means included in the resources finding query generating means for generating said resources finding query on the basis of the user request input to said application section and for issuing the resources finding query to a peripheral information processing apparatus;

session management means for performing data processing using the function of the selected peripheral information processing apparatus on the basis of the transmission of the response to the transmitted resources finding query from the selected peripheral information processing apparatus; and an environment adaptive engine for setting a function of the information processing apparatus corresponding to said user requested function.

11. An information processing apparatus according to claim 9, further comprising:

a service description database in which the capability information detected by said SCL processing section is stored, wherein the capability of providing the requested function based on the reception of the resources finding query is performed based on the contents of said service description database.

12. An information processing apparatus according to claim 9, wherein said resources generating means includes rich communication assisting means for generating said resources finding query on the basis of the user requested function and issuing the resources finding query to the peripheral information processing apparatus, wherein said rich communication assisting means performs processes for determining whether or not the determination of a peripheral information processing apparatus to be used on the basis of the obtained function information of the peripheral information processing apparatus is possible, for generating the resources finding query only when the determination is not possible, and for issuing the resources finding query to the peripheral information processing apparatus.

13. An information processing apparatus according to claim 9, further comprising:

session management means for performing session management for performing data processing using the function of the selected peripheral information processing apparatus on the basis of the transmission of the response to the transmitted resources finding query from the selected peripheral information processing apparatus; and an environment adaptive engine for setting a function of the information processing apparatus corresponding to said requested function, wherein the peripheral information processing apparatus receiving said resources using query issued by said information processing apparatus performs session management in said session management means and an environment adaptive process in said environment adaptive engine on the basis of said resources using query or an environment setting packet issued by said information processing apparatus.

14. A data processing method for use with a data processing system comprising a plurality of information processing apparatuses which can communicate with each other, said data processing method comprising the steps of:

issuing, from one main information processing apparatus, a resources finding query in which requested function information based on a user request is stored;

performing an SCL processing step of dynamically detecting changes in resource capability of the peripheral information processing apparatus determining whether or not the functions, based on the requested function information stored in the received resources finding query and the SCL processing step, can be provided in the peripheral information processing apparatus receiving said resources finding query, and transmitting a response, in which the determination result is stored as status information, to said main information processing apparatus;

selecting a peripheral information processing apparatus for which the function is to be used on the basis of the transmission of the response received by said main information processing apparatus from said peripheral information processing apparatus and issuing a resources using query to the selected peripheral information processing apparatus; and providing the function corresponding to said requested function in the peripheral information processing apparatus receiving the resources using query.

15. A data processing method according to claim 14, further comprising a step in which each of said information processing apparatuses stores in a service description database the capability information detected by said SCL processing step is stored, wherein the step of determining the capability of providing the requested function based on the reception of the resources finding query is performed based on the contents of said service description database.

16. A data processing method according to claim 14, further comprising a step in which said main information processing apparatus performs processes for determining whether or not the determination of a peripheral information processing apparatus to be used on the basis of the obtained function information of the peripheral information processing apparatus is possible, generating said resources finding query only when the determination is not possible, and issuing the resources finding query to the peripheral information processing apparatus.

17. A data processing method according to claim 14, further comprising a step in which the peripheral information processing apparatus receiving said resources finding/using query issued by said main information processing apparatus performs session management in session management means and an environment adaptive process in an environment adaptive engine on the basis of an environment setting packet issued by said main information processing apparatus.

18. A computer program stored on a computer readable medium for executing information processing in an information processing apparatus which is a constituent of a data processing system comprising a plurality of information processing apparatuses which can communicate with each other, said program comprising:

a step of generating a resources finding query in which requested function information based on a user request is stored and transmitting the resources finding query to a peripheral information processing apparatus which is a constituent of said plurality of information processing apparatuses;

a step of receiving a resources finding query, dynamically detecting changes in resource capability of the peripheral information processing apparatus, and determining whether or not the function, based on the requested function information stored in the received resources finding query and the detected changes in resource capability, can be provided, and generating a response to be transmitted, in which the determination result is stored as status information;

a step of selecting a peripheral information processing apparatus for which the function is to be used on the basis of the transmission of the response for the resources finding query and issuing a resources using query to the selected peripheral information processing apparatus; and a step of performing a process of setting the provision of the function corresponding to said requested function on the basis of the reception of said resources using query.

*19. A first communication apparatus comprising:*

*a communication unit configured to communicate with a second communication apparatus and a plurality of peripheral apparatuses; and*

*an information processing unit configured to:*

*(a) detect that a function in a communication with the second communication apparatus needs to be extended,*

*(b) for each of the plurality of peripheral apparatuses:*

*(i) generate a query asking whether a function can be provided by said peripheral apparatus, said query being transmitted to said peripheral apparatus by the communication unit, and*

*(ii) receive a response indicating whether said peripheral apparatus can provide the function, said peripheral apparatus having an SCL processing section which dynamically detects changes in resource capability, said peripheral apparatus determines whether the function can be provided based on processing by the SCL section,*

*(c) select one of the plurality of peripheral apparatuses as a provider of the function, and*

*(d) generate an instruction which instructs the selected peripheral apparatus to provide the function, the instruction being transmitted to the selected peripheral apparatus by the communication unit.*

*20. The first communication apparatus according to claim 19, wherein the communication unit communicates with the second communication apparatus via internet.*

*21. The first communication apparatus according to claim 20, wherein the communication unit communicates with the plurality of peripheral apparatuses via a local network.*

*22. The first communication apparatus according to claim 21, wherein the communication unit communicates with a TV system.*

*23. The first communication apparatus according to claim 22, which includes a display configured to display information from the second communication apparatus.*

*24. The first communication apparatus according to claim 23, which includes a switching unit switches between the display and the TV system.*

*25. The first communication apparatus according to claim 24, wherein, if a user request is inputted, the information processing unit detects that the function in the communication with the second communication apparatus needs to be extended.*

*26. The first communication apparatus according to claim 19, wherein, if the first communication apparatus is in a home area network, the information processing unit detects that the function in the communication with the second communication apparatus needs to be extended.*

*27. A communication system comprising:*

*a first communication apparatus including:*

*(a) a first communication unit configured to communicate with a second communication apparatus and a plurality of peripheral apparatuses; and*

*(b) a first information processing unit configured to:*

*(i) detect that a function in a communication with the second communication apparatus needs to be extended,*

*(ii) for each of the plurality of peripheral apparatuses:*

*(A) generate a query asking whether a function can be provided by said peripheral apparatus, the query being transmitted to said peripheral apparatus by the first communication unit,*

*(B) receive a response indicating whether said peripheral apparatus can provide the function, said peripheral apparatus having an SCL processing section which dynamically detects changes in resource capability, said peripheral apparatus determines whether the function can be provided based on processing by the SCL section,*

*(iii) select one of the plurality of peripheral apparatuses as a provider of the function, and*

*(iv) generate an instruction which instructs the selected peripheral apparatus to provide the function, the instruction being transmitted to the selected peripheral apparatus by the first communication unit; and*

*the selected peripheral apparatus including:*

*(a) a second communication unit configured to communicate with the first communication apparatus; and*

*(b) a second information processing unit configured to:*

*(i) receive the query transmitted to said selected peripheral apparatus from the first communication apparatus,*

*(ii) respond to the first communication apparatus according to the query,*

*(iii) receive the instruction from the first communication apparatus, and*

*(iv) provide the function according to the instruction from the first communication apparatus.*

*28. The communication system according to claim 27, wherein the first communication unit communicates with the second communication apparatus via internet.*

*29. The communication system according to claim 28, wherein the first communication unit communicates with the plurality of peripheral apparatuses via a local network.*

*30. The communication system according to claim 29, wherein the first communication unit communicates with a TV system.*

*31. The communication system according to claim 30, wherein the first communication apparatus includes a display configured to display information from the second communication apparatus.*

*32. The communication system according to claim 31, wherein the first communication apparatus includes a switching unit switches between the display and the TV system.*

*33. The communication system according to claim 32, wherein, if a user request is inputted, the first information processing unit detects that the function in the communication with the second communication apparatus needs to be extended.*

*34. The communication system according to claim 27, wherein, if the first communication apparatus is in a home area network, the first information processing unit detects that the function in the communication with the second communication apparatus needs to be extended.*

*35. A first communication apparatus comprising:*

*a communication means for communicating with a second communication apparatus and a plurality of peripheral apparatuses; and*

*an information processing means for:*

*(a) detecting that a function in a communication with the second communication apparatus needs to be extended,*

*(b) for each of the plurality of peripheral apparatuses:*

*(i) generating a query asking whether a function can be provided by said peripheral apparatus, the query being transmitted to said peripheral apparatus by the communication means, and*

*(ii) receiving a response indicating whether said peripheral apparatus can provide the function, said peripheral apparatus having an SCL processing section which dynamically detects changes in resource capability, said peripheral apparatus determines whether the function can be provided based on processing by the SCL section,*

*(c) selecting one of the plurality of peripheral apparatuses as a provider of the function, and*

*(d) generating an instruction which instructs the selected peripheral apparatus to provide the function, the instruction being transmitted to the selected peripheral apparatus by the communication means.*

*36. A communication system comprising:*

*a first communication apparatus including:*

*(a) a first communication means for communicating with a second communication apparatus and a plurality of peripheral apparatuses; and*

*(b) a first information processing means for:*

*(i) detecting that a function in a communication with the second communication apparatus needs to be extended,*

*(ii) for each of the peripheral apparatuses:*

*(A) generating a query asking whether a function can be provided by said peripheral apparatus, the query being transmitted to said peripheral apparatus by the first communication means, and*

*(B) receiving a response indicating whether said peripheral apparatus can provide the function, said peripheral apparatus having an SCL processing section which dynamically detects changes in resource capability, said peripheral apparatus determines whether the function can be provided based on processing by the SCL section,*

*(iv) selecting one of the plurality of peripheral apparatuses as a provider of the function, and*

*(v) generating an instruction which instructs the selected peripheral apparatus to provide the function, the instruction being transmitted to the selected peripheral apparatus by the first communication means;*

*the selected peripheral apparatus, including:*

*(a) a second communication means for communicating with the first communication apparatus; and*

*(b) a second information processing means for:*

*(i) receiving the query transmitted to the selected peripheral apparatus from the first communication apparatus,*

*(ii) responding to the first communication apparatus according to the query,*

*(iii) receiving the instruction from the first communication apparatus, and*

*(iv) providing the function according to the instruction from the first communication apparatus.*

*37. A computer readable memory storing instructions structured to cause a first communication apparatus including a communication unit and an information processing unit to:*

*(a) communicate with a second communication apparatus and a plurality of peripheral apparatuses;*

*(b) detect that a function in a communication with the second communication apparatus needs to be extended;*

*(c) for each of the plurality of peripheral apparatuses:*

*(i) generate a query asking whether a function can be provided by said peripheral apparatus, said query being transmitted to said peripheral apparatus by the communication unit, and*

*(ii) receive a response indicating whether said peripheral apparatus can provide the function; said peripheral apparatus having an SCL processing section which dynamically detects changes in resource capability, said peripheral apparatus determines whether the function can be provided based on processing by the SCL section;*

*(d) select one of the plurality of peripheral apparatuses as a provider of the function;*

*(e) generate an instruction which instructs the selected peripheral apparatus to provide the function; and*

*(f) transmit the instruction to the selected peripheral apparatus.*

*38. A computer readable memory storing instructions structured to cause:*

*(a) a first communication apparatus including a first communication unit and a first information processing unit to:*

*(i) detect that a function in a communication with a second communication apparatus needs to be extended,*

*(ii) for each of the plurality of peripheral apparatuses,*

*(A) generate a query asking whether a function can be provided by said peripheral apparatus, said query being transmitted to said peripheral apparatus by the first communication unit, and*

(B) *receive a response indicating whether said peripheral apparatus can provide the function, said peripheral apparatus having an SCL processing section which dynamically detects changes in resource capability, said peripheral apparatus determines whether the function can be provided based on processing by the SCL section,*

(iii) *select one of the plurality of peripheral apparatuses as a provider of the function,*

(iv) *generate an instruction which instructs the selected peripheral apparatus to provide the function, and*

(v) *transmit the instruction to the selected peripheral apparatus; and*

(b) *the selected peripheral apparatus:*

(i) *receive the query transmitted to the selected peripheral apparatus from the first communication apparatus,*

(ii) *respond to the first communication apparatus according to the query,*

(iii) *receive the instruction from the first communication apparatus, and*

(iv) *provide the function according to the instruction from the first communication apparatus.*

*39. A method of operating a first communication apparatus including instructions, the method comprising:*

(a) *causing a communication unit to communicate with a second communication apparatus and a plurality of peripheral apparatuses;*

(b) *causing an information processing unit to execute the instructions to detect that a function in a communication with the second communication apparatus needs to be extended;*

(c) *for each of the plurality of peripheral apparatuses:*

(i) *causing the information processing unit to execute the instructions to generate a query asking whether a function can be provided by said peripheral apparatus, the query being transmitted to said peripheral apparatus by the communication unit;*

(ii) *causing the information processing unit to execute the instructions to receive a response indicating whether said peripheral apparatus can provide the function; said peripheral apparatus having an SCL processing section which dynamically detects changes in resource capability, said peripheral apparatus determines whether the function can be provided based on processing by the SCL section;*

(d) *causing the information processing unit to execute the instructions to select one of the plurality of peripheral apparatuses as a provider of the function;*

(e) *causing the information processing unit to execute the instructions to generate an instruction which instructs the selected peripheral apparatus to provide the function, and*

(f) *causing the information processing unit to execute the instructions to transmit the instruction to the selected peripheral apparatus.*

*40. The communication method according to claim 39, which includes causing the communication unit to communicate with the second communication apparatus via internet.*

*41. The communication method according to claim 40, which includes causing the communication unit to communicate with the plurality of peripheral apparatuses via a local network.*

*42. The communication method according to claim 41, which includes causing the communication unit to communicate with a TV system.*

*43. The communication method according to claim 42, which includes causing a display device to display information from the second communication apparatus.*

*44. The communication method according to claim 43, which includes causing a switching unit to switch between the display and the TV system.*

*45. The communication method according to claim 44, which includes, if a user request is inputted, causing the information processing unit to execute the instructions to detect that the function in the communication with the second communication apparatus needs to be extended.*

*46. The communication method according to claim 39, which includes, if the first communication apparatus is in a home area network, causing the information processing unit to execute the instructions to detect that the function in the communication with the second communication apparatus needs to be extended.*

*47. A method of operating a communication system which includes: (a) a first communication apparatus including: (i) a first communication unit; (ii) a first information processing unit; and (iii) first instructions; and (b) a second communication apparatus including: (i) a second communication unit; (ii) a second information processing unit; and (iii) second instructions, the method comprising:*

(a) *causing the first communication unit to communicate with the second communication apparatus and a plurality of peripheral apparatuses;*

(b) *causing the first information processing unit to execute the first instructions to detect that a function in a communication with the second communication apparatus needs to be extended,*

(c) *for each of the plurality of peripheral apparatuses:*

(i) *causing the first information processing unit to execute the first instructions to generate a query asking whether a function can be provided by said peripheral apparatus, the query being transmitted to said peripheral apparatus by said first communication unit, and*

(ii) *causing the first communication unit to receive a response indicating whether said peripheral apparatus can provide the function, said peripheral apparatus having an SCL processing section which dynamically detects changes in resource capability, said peripheral apparatus determines whether the function can be provided based on processing by the SCL section,*

(d) *causing the first information processing unit to execute the first instructions to select one of the plurality of peripheral apparatuses as a provider of the function,*

(e) *causing the first information processing unit to execute the first instructions to generate an instruction which instructs the selected peripheral apparatus to provide the function, and*

(f) *causing the first information processing unit to execute the first instructions to transmit the instruction to the selected peripheral apparatus;*

(g) *causing the selected peripheral apparatus to receive the transmitted query,*

(h) *causing the second communication apparatus to respond to the first communication apparatus according to the query transmitted to the selected peripheral apparatus,*

(i) *causing the second communication apparatus to receive the instruction from the first communication apparatus, and*

(*j*) *causing the second communication apparatus to provide the function according to the instruction from the first communication apparatus.*

*48. The communication method according to claim 47, which includes causing the first communication unit to communicate with the second communication apparatus via internet.*

*49. The communication method according to claim 48, which includes causing the first communication unit to communicate with the plurality of peripheral apparatuses via a local network.*

*50. The communication method according to claim 49, which includes causing the first communication unit to communicate with a TV system.*

*51. The communication method according to claim 50, which includes causing a display device to display information from the second communication apparatus.*

*52. The communication method according to claim 51, which includes causing a switching unit to switch between the display device and the TV system.*

*53. The communication method according to claim 52, which includes, if a user request is inputted, causing the first information processing unit to detect that the function in the communication with the second communication apparatus needs to be extended.*

*54. The communication method according to claim 47, which includes, if the first communication apparatus is in a home area network, causing the first information processing unit to execute the first instructions to detect that the function in the communication with the second communication apparatus needs to be extended.*

* * * * *